United States Patent [19]

Blair

[11] Patent Number: 5,681,136
[45] Date of Patent: Oct. 28, 1997

[54] LOCK WASHER

[75] Inventor: James F. L. Blair, 3N435 Ponderosa Dr., St. Charles, Ill. 60175

[73] Assignee: James F. L. Blair, St. Charles, Ill.

[21] Appl. No.: 528,020

[22] Filed: Sep. 14, 1995

[51] Int. Cl.$^6$ ..................................................... F16D 39/00
[52] U.S. Cl. ........................ 411/160; 411/120; 411/133
[58] Field of Search .................................. 411/120, 121, 411/125, 126, 127, 133, 160

[56]     References Cited

U.S. PATENT DOCUMENTS

| 92,241 | 7/1869 | Williams | 411/124 |
|---|---|---|---|
| 287,390 | 10/1883 | Reese | 411/125 |
| 314,888 | 5/1885 | Smith | 411/126 |
| 718,838 | 1/1903 | Hawkins | 411/126 |
| 788,718 | 5/1905 | Hawkins | 411/127 |

FOREIGN PATENT DOCUMENTS 410513  12/1909  France ........................... 411/133

Primary Examiner—Rodney M. Lindsey
Assistant Examiner—Fredrick Conley
Attorney, Agent, or Firm—Wood, Phillips, VanSanten, Clark & Mortimer

[57]     ABSTRACT

Corrosion, loosening, safety and reusability problems incurred with prior art lock washers are eliminated in a lock washer having a planar washer body (6) formed of a thin sheet of resilient metal. A central aperture (12) is located in the body (6) and is adapted to receive the shank (24) of a bolt which a nut (22) is to be attached and locked. A lock fold (8) is formed in the body (6) radially outward of the central aperture (12). The lock fold (8) has a radially inward facing curved edge (18) displaced to one side of the plane of the body (6). The edge (18) is transverse to the radius of the body (6) and a lock fold (8) resiliently, lockingly engages with a flat of the nut.

4 Claims, 1 Drawing Sheet

LOCK WASHER

FIELD OF THE INVENTION

This invention relates to a lock washer, and more particularly, to a lock washer that will positively retain a nut, is not susceptible to corrosion problems, omits a free edge that can get caught on clothing and be permanently deformed, and which is readily releasable as well as reusable.

BACKGROUND OF THE INVENTION

Lock washers are commonly used in many different fields. As a consequence, there are large varieties of lock washer configurations that have evolved over the years for use in specific environments. Many have detriments of one sort or another associated with their use.

For example, it is not unusual to provide lock washers that include a sharp edge or point displaced from the body of the washer so as to dig in or gouge one or both of the nut that is being locked and the surface to which the nut is applied. While these types of lock washers work well for their intended purpose in many environments, they are not satisfactory where corrosion presents a problem. More particularly, where such lock washers are used after a protective coating has been applied to one or the other of the components to be joined, the gouging action provided by the sharp edge will always penetrate the coating if a good locked joint is to be obtained. As a result, the protective coating is no longer continuous and moisture or other corrosive substances may penetrate the joint with corrosion resulting.

Other lock washers include lock tabs which are displaced from the plane of the body of the washer and which have flat, free edges which are adapted to abut a flat of the nut to be locked. See, for example, U.S. Pat. No. 1,349,404 issued Aug. 10, 1920 to Blake. In this construction, a plurality of lock tabs greater in number than the number of flats on the nut to be locked is provided and all project away from the plane of the washer to be located about the periphery of the nut. While these types of lock washers work well in terms of providing the desired locking function, it is difficult to loosen the locked nut and reuse of the lock washer may be a problem.

Typically, such lock washers are made of a resilient metal and each of the lock tabs requires a force of 8–10 lbs. to depress the same back into the plane of the base of the washer. It is necessary to displace each tab back into the plane of the base of the washer to move it out of interfering relation with the flats of the nut if the nut is to be loosened.

When a number of the tabs are present as in Blake and other constructions, the total force involved may be 65–80 lbs. While such a force may be applied axially through the use of a socket wrench, where it is necessary to loosen the nut with a box end or open end wrench, the average user of such a tool is incapable of applying such a force over the lever arm represented by the length of the wrench, making removal difficult, if not impossible.

Furthermore, such constructions are extremely difficult to loosen with an open end wrench even if the force of the locked tabs can be overcome. Specifically, an open end wrench, by reason of its open ended geometry, will typically be incapable of depressing all of the lock tabs which in turn means that one or more lock tabs will spring into locking position in abutment with the flat of the nut, preventing its rotation.

If, in such a situation, rotation of the nut is forced, then the lock washer will be permanently distorted and cannot be reused.

French patent document 1,394,517 issued Feb. 22, 1965 to Bruhwiler, et al., provides a means of at least overcoming potential corrosion problems through the use of a locating tab on the body of the lock washer which may be received in a notch or recess in the surface to which the lock washer is applied to prevent the lock washer from rotating. However, Bruhwiler continues to employ a large number of lock tabs that require substantial force to displace into the plane of the washer body and which prevent ready loosening of the nut with a tool such as an open end wrench. Furthermore, the pointed lock tabs of Bruhwiler may hinder loosening of the nut in that they may have a tendency to dig into the sides of the loosening tool and hinder its rotation. When such occurs, to the extent the rotation is forced, then the lock tabs are permanently deformed and the Bruhwiler lock washer cannot be reused.

The present invention is directed to overcoming one or more of the above problems.

SUMMARY OF THE INVENTION

It is the principal object of the invention to provide a new and improved lock washer. More specifically, it is an object of the invention to provide a lock washer whose installation does not cause corrosion problems; which, when installed, does not require the application of undue force in order to depress locking folds; which is reusable; which minimizes nut vibration and can be economically manufactured in low volume.

It is also an object of the invention to provide a lock washer with a body having a continuous uninterrupted edge about lock folds thereon, so that when the lock folds resiliently, lockingly engage with a flat of the nut, the continuous uninterrupted edge is such that clothing or other objects cannot be caught or snagged on the lock folds.

It is also an object of the invention to provide a lock washer that is susceptible to use in a large variety of environments, including in aircraft environments, and does not require the use of labor intensive and non-reusable safety wire. It is a further object to provide such a lock washer that when installed, is free from sharp edges that could cause tearing of apparel that might come in contact therewith.

It is also an object of the invention to provide a lock washer that will not mar the surface of the item being fastened, as the lock washer will be prevented from rotating with respect to said item being fastened.

It is also an object of the invention to provide a lock washer of the type having locked folds that will not stick or gouge into the underside of a loosening tool.

It is also an object of the invention to provide a lock washer that is such that if the clamping load is lost, the lock washer is such as to minimize nut motion to resist the effects of shock and vibration.

An exemplary embodiment of the invention achieves one or more of the above objects in a lock washer for use with a nut having n flats where n is an integer equal to 4, 5 or 6. The lock washer includes a generally planar washer body formed of a thin sheet of resilient metal. A central aperture is located in the body and is capable of receiving the shank of a bolt to which the nut is to be attached and locked. A lock fold located radially outwardly of the central aperture is displaced to one side of the plane of the body at a point on the perimeter of the body spaced from the central aperture a distance greater than the spacing of a flat on the nut from the central aperture. The lock fold resiliently and lockingly engages with a flat of the nut thereby preventing the nut from loosening. The washer body has a continuous uninterrupted edge thereby avoiding the use of a free edge on which clothing or other objects may catch or snag.

In a preferred embodiment, the generally planar washer body is circular.

In a preferred embodiment, the lock washer further includes a key protruding from the perimeter of the aperture opening and displaced as to one side of the plane of said washer body thereof opposite the lock fold. The key engages with the keyway of a bolt to keep the lock washer from rotating with respect to the shank of the bolt or the like, and prevents marring of the surface in any manner.

In one embodiment, two opposed points on the perimeter of the body are spaced a distance greater than that between two opposed flats on the nut, to define at least two opposed resilient lock folds. Each of the two lock folds are formed in the body radially outwardly from the aperture opening, and are displaced to one side of the plane of the washer body to resiliently and releasably engage with two corresponding flats of the nut to hold the nut in a locked position.

In one embodiment of the invention, according to another facet thereof, there is provided a lock washer having a generally planar, circular washer body with a central aperture as defined before. A key protrudes from the perimeter of the aperture opening and is displaced as to one side of the plane of the washer body, opposite the lock folds. Four equally angularly spaced points on the perimeter of the body define four resilient lock folds, opposed ones of the lock folds being spaced a distance greater than the spacing between two opposed flats on the nut. The lock folds are all formed in the body radially outward of the aperture opening, and curved to one side of the plane of said body from the plane of the washer body to engage with corresponding flats of the nut to secure the nut in a locked position.

Other objects and advantages will become apparent from the following specification taken in connection with the accompanying drawings.

DESCRIPTION OF THE PREFERRED EMBODIMENT

Figure 1:
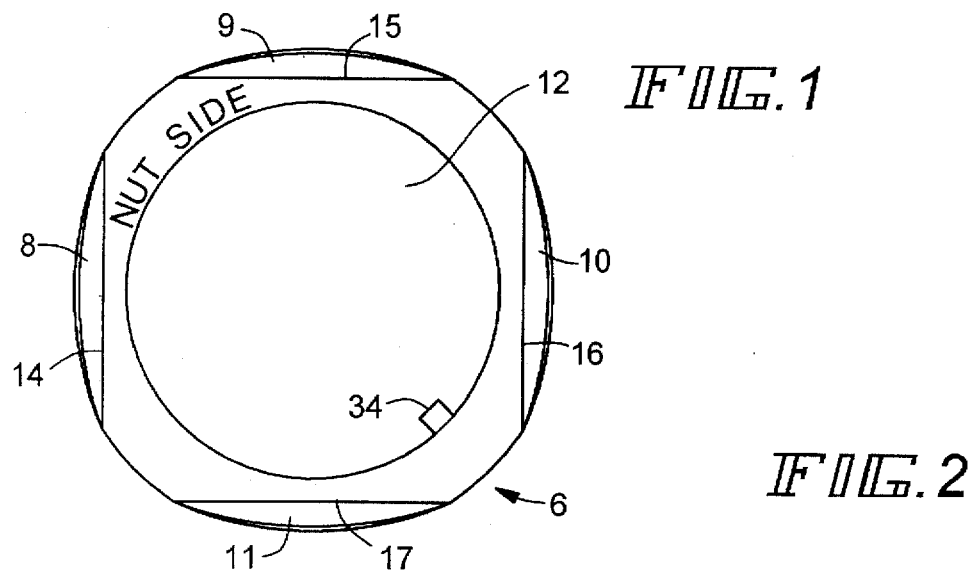
FIG. 1 is a plan view of one embodiment of a lock washer made according to the invention.
Figure 2:
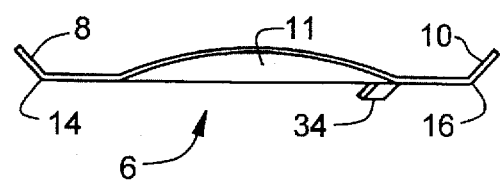
FIG. 2 is a side elevation of the lock washer.

Referring to FIGS. 1–4, inclusive, a first embodiment of the invention will be described in detail. The lock washer includes a ring-like body, generally designated 6, formed from a thin sheet of resilient, metallic material. Preferably, tempered stainless steel sheet having a thickness of 0.013"–0.017" is employed. As best seen in FIG. 2, the body 6 is planar except for four lock folds 8, 9, 10 and 11. The lock folds 8, 9, 10 and 11 are equally angularly spaced about the periphery of the body 6 which is to say they are at 90° to each other.

The body 6 includes a central aperture 12 which is generally circular. As will be appreciated by those with ordinary skill in the art, the diameter of the central aperture 12 will be just slightly greater than the diameter of the shank of the bolt whose nut is to be locked.

The four lock folds 8, 9, 10 and 11 are defined by four bend lines 14, 15, 16 and 17, respectively, which are located radially outward of the central aperture 12. The respective folds 8, 9, 10 and 11 are bent on the lines 14, 15, 16 and 17 from the plane of the body 6 to one side thereof at an acute angle that typically will be in the range of 40°–60°. Opposed ones of the bend lines 14, 16 and 15, 17 are parallel to one another and are spaced a distance just slightly greater than the spacing between opposed flats on the nut to be locked, the distance also being less than that between opposed points on the nut to be locked.

Figure 3:
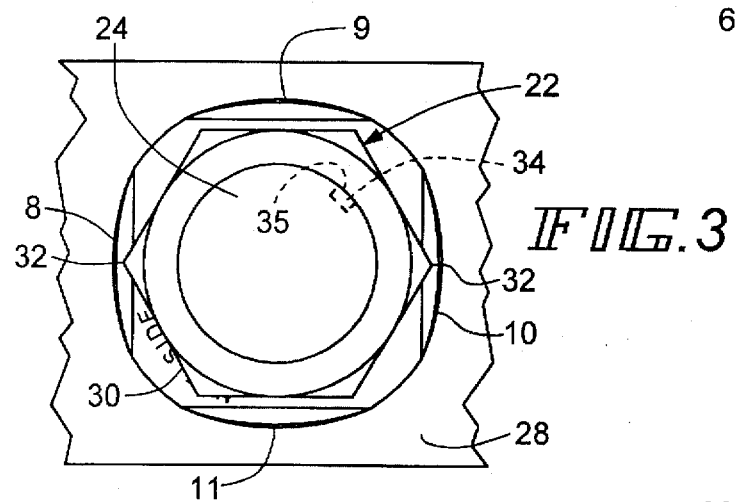
FIG. 3 is a plan view of the lock washer of FIGS. 1 and 2 as it would appear if installed.

It will be readily appreciated from FIG. 3 that the folds 8 and 10 or the folds 9 and 11 need not always be diametrically opposite one another. If the nut with which the washer is to be used is a five sided nut, the opposed lock folds will not be directly opposite one another.

Figure 4:
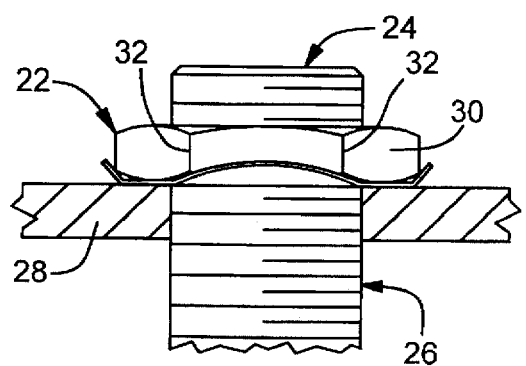
FIG. 4 is a side elevation of the installed lock washer with parts shown in section.

Turning to FIGS. 3 and 4, specifically, a nut generally designated 22, has been applied to the shank, generally designated 24, of a bolt, which is impaled through an aperture 26 in a metal panel 28 or the like. As can be seen, the nut 22 is a hex nut which is to say it has six, equally angularly spaced flats 30 as is well known although the nut 22 could have only four or five flats 30 if desired. Adjacent flats 30 are separated by points 32. The nut 22 sandwiches the body 6 of the lock washer against the panel 28 such that the lock folds 8, 9, 10 and 11 extend away from the panel 28. As can be appreciated from FIGS. 3 and 4, the lock folds 9 and 11, due to their inherent resilience, are displaced from the plane of the body 6 and are in substantial abutment with corresponding ones of the flats of the nut 30 along a substantial portion of the length thereof. As a consequence, rotation of the nut 22 is blocked by the lock folds 9 and 11 to prevent the same from loosening. At this point in time, the lock folds 8 and 10 underlie opposed points 32 and are depressed into the plane of the body 6 where they do not appreciably resist rotation of the nut 22 except in the case where the clamping load is lost. If the nut 22 is to be further tightened on the shank 24, the points 32 will cam the lock folds 9 and 11 back down into the plane of the body 6 to allow such tightening. At the same time, when the point 32 depressing the tab 8 passes past the end of the bend line 14 thereof, the tab 8 will spring up to abut one of the flats 30 and resist rotation unless, of course, held down by a tool or the like. A similar action will occur at the lock tab 10.

When it is desired to loosen the nut 22, a tool such as a socket wrench, an open wrench or a box wrench, is applied to the nut and a small force applied to the same along the axis of the shank 24. Since, when using a lock washer according to the invention, the nut is always holding down some or all of the lock folds 8, 9, 10 and 11, fewer tabs need to be depressed to loosen the nut. This in turn means that significantly less force is required to depress said lock folds back into the plane of the washer body in order to loosen the nut. This is in contrast with the great amount of force (65 lbs.–80 lbs.) required in some prior art constructions, and makes washers made according to the invention substantially easier to use in terms of loosening the nut.

Because so little force is required to depress one or more of the lock folds 8 or 10, it will readily be appreciated that there is no need to force the rotation of the nut 22 against any of the folds to permanently deform the same. Additionally, because the washer body maintains a continuous uninterrupted edge, the possibility of permanently deforming the fold with either the point 32 of the nut 22 or some other external force (such as clothing or other objects that may be caught on a free edge contained in some prior art) is substantially reduced. Consequently, a lock washer made according to the invention is readily reusable and easily maintains its integrity.

It will also be appreciated that the embodiment of FIGS. 1–4, through the use of a planar body 6, does not gouge or penetrate either the nut or the panel 28. As a consequence, corrosion producing sites are avoided. Furthermore, sharp points are avoided throughout.

The lock washer may further include a key 34 protruding radially inward from the perimeter of the aperture opening 12. The key 34 is displaced as to one side of the plane of the washer body 6 thereof opposite the side to which the lock folds 8, 9, 10, and 11 are displaced. When displaced, the key 34 will engage with a keyway 35 of the shank 24 of the bolt or in a bushing or the like. This engagement will keep the lock washer from rotating with respect to the shank 24 of the bolt and prevent marring of the panel.

From the foregoing, it will be readily appreciated that a lock washer made according to this invention is highly advantageous in that it completely eliminates the generation of corrosion sites, is readily and easily loosened intentionally through the use of standard tools such as open end wrenches, eliminates vibratory motion of the nut when clamp load is lost, and is reusable. The absence of exposed edges or points is highly desirable to prevent safety hazards in many environments and the lock washer provides a positive lock without any need for safety wire or the like.

I claim:

1. A lock washer for use with a polygonal nut having n equally sized flats, where n is an integer equal to 4, 5 or 6, said lock washer comprising:

a generally planar, circular washer body;

said washer body being formed of a thin sheet of resilient metal;

a central aperture in said body capable of receiving the shank of a bolt;

first and second lock folds formed in said body radially outwardly of said central aperture and being displaced to one side of a plane of said body from a plane of the washer body to resiliently, lockingly engage with a flat of a nut;

said lock folds being spaced about said aperture so that when one lock fold is lockingly engaging a flat of a nut, at least one of the other lock folds underlies a point of the nut between two adjacent flats thereof;

the washer body having a continuous uninterrupted edge.

2. The lock washer of claim 1 further including a key protruding from the perimeter of the aperture opening, displaced as to one side of the plane of said washer body thereof opposite said lock fold, and engaging with the keyway of the bolt.

3. The lock washer of claim 1 further including a key protruding from the perimeter of the washer body being displaced to one side of the plane of said washer body opposite said lock folds, said key being engageable with the keyway of a bolt, and preventing relative rotation between the lock washer and the item being fastened.

4. A lock washer for use with a polygonal nut having n equally sized flats, where n is an integer equal to 4, 5 or 6, said lock washer comprising:

a generally planar, circular washer body;

said washer body being formed of a thin sheet of resilient metal;

a central aperture in said body capable of receiving the shank of a bolt;

at least three lock folds formed in said body radially outwardly from the aperture opening;

said lock folds being displaced to one side of a plane of said body from a plane of the washer body to resiliently and releasably engage with a flat of a nut and said lock folds being spaced about said washer body at least one lock fold will underlie a point of a nut between two adjacent flats thereof when at least one other lock fold engages with a flat of the nut to hold the nut in a locked position;

the washer body having a continuous uninterrupted edge.

* * * * *